(12) United States Patent
Liu et al.

(10) Patent No.: US 11,829,552 B2
(45) Date of Patent: Nov. 28, 2023

(54) DISPLAY PANEL, CONTROL METHOD THEREOF, AND DISPLAY DEVICE COMBINING A FINGERPRINT RECOGNITION FUNCTION AND A TOUCH DETECTION FUNCTION

(71) Applicant: BOE TECHNOLOGY GROUP CO., LTD., Beijing (CN)

(72) Inventors: Yingming Liu, Beijing (CN); Haisheng Wang, Beijing (CN); Xiaoliang Ding, Beijing (CN); Lei Wang, Beijing (CN); Peixiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 598 days.

(21) Appl. No.: 17/041,109

(22) PCT Filed: Apr. 8, 2020

(86) PCT No.: PCT/CN2020/083710
§ 371 (c)(1),
(2) Date: Sep. 24, 2020

(87) PCT Pub. No.: WO2020/248677
PCT Pub. Date: Dec. 17, 2020

(65) Prior Publication Data
US 2023/0053804 A1    Feb. 23, 2023

(30) Foreign Application Priority Data
Jun. 10, 2019  (CN) .......................... 201910495548.0

(51) Int. Cl.
*G06V 40/12*  (2022.01)
*G06F 3/041*  (2006.01)
(Continued)

(52) U.S. Cl.
CPC .......... *G06F 3/04166* (2019.05); *G06F 3/043* (2013.01); *G06F 3/04164* (2019.05); *G06V 40/1306* (2022.01); *G06V 40/1359* (2022.01)

(58) Field of Classification Search
CPC ............. G06F 3/04166; G06F 3/04164; G06F 3/0412; G06F 3/0416; G06F 3/043–0436;
(Continued)

(56) References Cited

U.S. PATENT DOCUMENTS

2017/0110504 A1 *  4/2017  Panchawagh .......... H10N 39/00
2017/0322292 A1    11/2017  Salvia et al.
(Continued)

FOREIGN PATENT DOCUMENTS

| CN | 107451573 A | 12/2017 |
|---|---|---|
| CN | 108563361 A | 9/2018 |
| CN | 110210435 A | 9/2019 |

OTHER PUBLICATIONS

First Office Action dated Oct. 22, 2020, relating to CN Patent Application No. 201910495548.0.
Second Office Action dated Mar. 16, 2021, relating to CN Patent Application No. 201910495548.0.

*Primary Examiner* — Roberto W Flores
(74) *Attorney, Agent, or Firm* — DINSMORE & SHOHL LLP

(57) ABSTRACT

The display panel comprises: a display substrate and a touch detection device; wherein the touch detection device comprises: a touch substrate located on a side of the display substrate away from a display surface, and a plurality of ultrasonic detection units located on a side of the touch substrate away from the display substrate; the ultrasonic detection unit comprises: a first electrode located on a side of the touch substrate away from the display substrate, a plurality of second electrodes between the touch substrate and the first electrode, and a piezoelectric induction layer
(Continued)

between the first electrode and the second electrodes; in a fingerprint recognition stage, at least a part of the ultrasonic detection units in a fingerprint recognition area are used as an ultrasonic-generating source, and the second electrodes in at least a part of the ultrasonic detection units in the fingerprint recognition area respectively output fingerprint recognition signals.

12 Claims, 8 Drawing Sheets

(51) Int. Cl.
  *G06V 40/13* (2022.01)
  *G06F 3/043* (2006.01)
(58) Field of Classification Search
  CPC .......... G06V 40/1306; G06V 40/1359; G06V 40/1365; G09G 3/00–38
  See application file for complete search history.

(56) References Cited

U.S. PATENT DOCUMENTS

| | | | |
|---|---|---|---|
| 2018/0046302 A1* | 2/2018 | Wang | G06F 3/0412 |
| 2019/0324569 A1 | 10/2019 | Ma et al. | |
| 2019/0354209 A1* | 11/2019 | Tang | G01S 15/8925 |
| 2020/0134280 A1* | 4/2020 | Apte | G06V 40/1306 |
| 2020/0242325 A1* | 7/2020 | Hashimoto | G06V 40/13 |
| 2021/0319196 A1* | 10/2021 | Rhee | G01L 1/16 |

\* cited by examiner

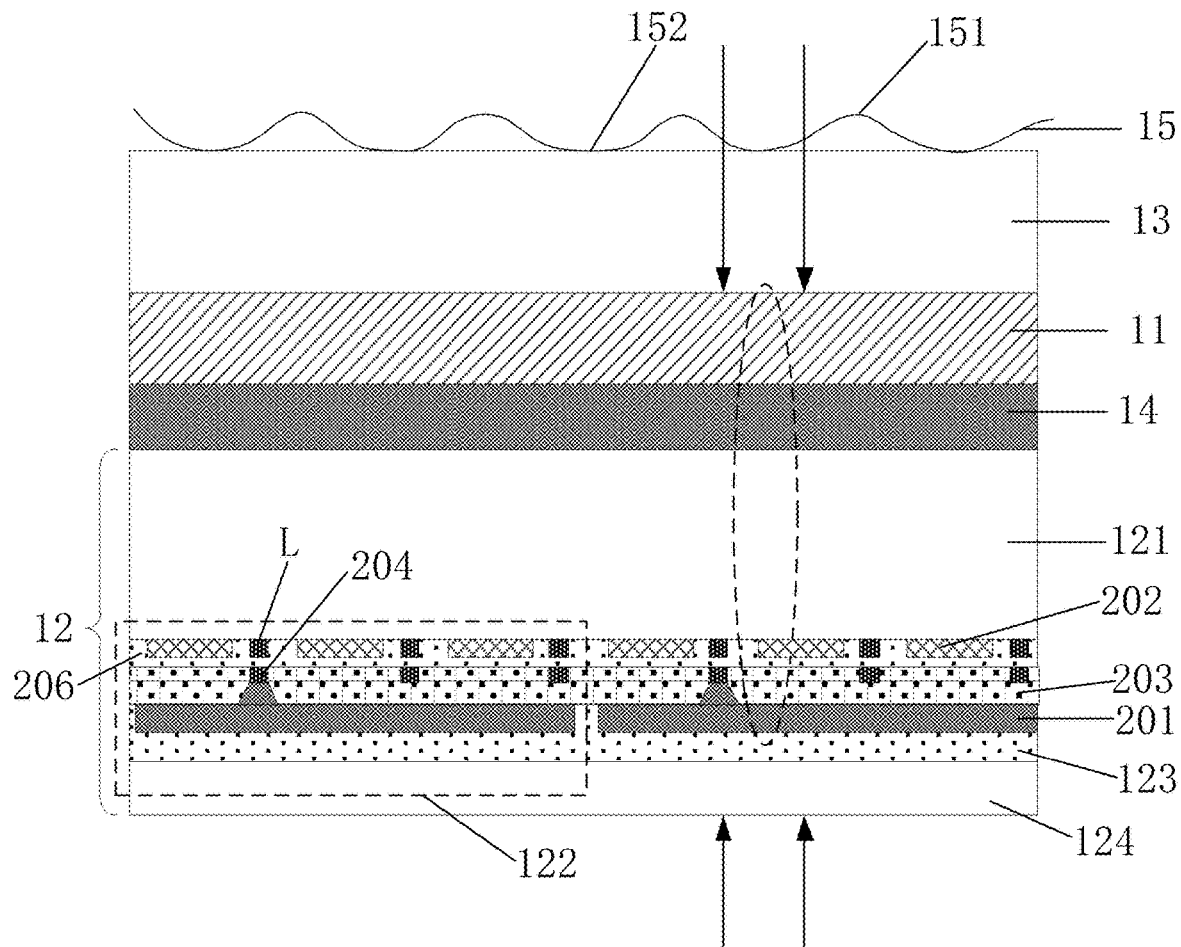

FIG. 6b

S301 Driving the ultrasonic detection units to emit an ultrasonic wave, and determining a touch position according to a touch detection signal output from the ultrasonic detection units after receiving the ultrasonic wave S302 Determining a fingerprint recognition area according to the touch position, wherein the touch position is located inside the fingerprint recognition area S303 Driving at least a part of the ultrasonic detection units located in the fingerprint recognition area to emit an ultrasonic wave, and determining distribution of valleys and ridges in the fingerprint recognition area according to fingerprint recognition signals output from the second electrodes in the at least a part of the ultrasonic detection units after receiving the ultrasonic wave

FIG. 7

DISPLAY PANEL, CONTROL METHOD THEREOF, AND DISPLAY DEVICE COMBINING A FINGERPRINT RECOGNITION FUNCTION AND A TOUCH DETECTION FUNCTION

CROSS-REFERENCE TO RELATED APPLICATIONS

This application is a U.S. National Stage under 35 U.S.C. § 371 of International Application No. PCT/CN2020/083710, as filed on Apr. 8, 2020, which claims the priority to the Chinese patent application No. 201910495548.0 filed on Jun. 10, 2019 and entitled "DISPLAY PANEL, CONTROL METHOD THEREOF AND DISPLAY DEVICE". The disclosure of each of these applications is hereby incorporated by reference in its entirety into the present application.

TECHNICAL FIELD

The present disclosure relates to the technical field of touch detection, and in particular, to a display panel, a control method thereof, and a display device.

BACKGROUND

With the rapid development of science and technology, mobile products with a biometric identification function gradually come into people's lives. The fingerprint is a natural characteristic of human body, unique and distinctive from one another, and thus attracts extensive attention. The fingerprint is composed of a series of valleys and ridges on a skin surface of the fingertip, and composition details of these valleys and ridges generally include details such as branches of the ridges, ends of the ridges, arches, tented arches, left loop, right loop, whorl, or twin loop, which decide the unique characteristic of the fingerprint.

SUMMARY

In a first aspect, some embodiments of the present disclosure provide a display panel, comprising: a display substrate and a touch detection device; wherein
  the touch detection device comprises: a touch substrate located on a side of the display substrate away from a display surface, and a plurality of ultrasonic detection units located on a side of the touch substrate away from the display substrate;
  the ultrasonic detection unit comprises: a first electrode located on a side of the touch substrate away from the display substrate, a plurality of second electrodes between the touch substrate and the first electrode, and a piezoelectric induction layer between the first electrode and the second electrodes;
  in a touch detection stage, the ultrasonic detection unit is used as an ultrasonic-generating source, and the ultrasonic detection unit outputs a touch detection signal as a whole; and
  in a fingerprint recognition stage, at least a part of the ultrasonic detection units in a fingerprint recognition area are used as an ultrasonic-generating source, and the second electrodes in the at least a part of the ultrasonic detection units in the fingerprint recognition area respectively output fingerprint recognition signals.

In a possible implementation, in the display panel provided in some embodiments of the present disclosure, the first electrode is block-shaped, and the plurality of first electrodes are arranged in an array; and
  in the ultrasonic detection unit, an orthographic projection of the second electrodes on the touch substrate is located inside an orthographic projection of the first electrode on the touch substrate.

In a possible implementation, in the display panel provided in some embodiments of the present disclosure, the piezoelectric induction layers in the ultrasonic detection units are independent of each other.

In a possible implementation, in the display panel provided in some embodiments of the present disclosure, the first electrodes of the plurality of ultrasonic detection units are of an integrated structure.

In a possible implementation, in the display panel provided in some embodiments of the present disclosure, the touch detection device further comprises: a plurality of control circuits in one-to-one correspondence with the second electrodes, and read signal lines, wherein the control circuit is located between the second electrode and the touch substrate and configured to control whether to output an signal output from the corresponding second electrode; and
  the second electrode is electrically connected with the corresponding control circuit, and the read signal lines are connected with output ends of at least a part of the control circuits.

In a possible implementation, in the display panel provided in some embodiments of the present disclosure, the second electrodes are disposed in the same layer as the read signal lines.

In a possible implementation, in the display panel provided in some embodiments of the present disclosure, the touch detection device further comprises: driving leads electrically connected with the first electrodes in a one-to-one correspondence manner;
  the driving lead is disposed in the same layer as the read signal line, and the driving lead is electrically connected with the corresponding first electrode through a through hole in the piezoelectric induction layer; or,
  the driving lead is located on a side of the read signal line close to the first electrode, the driving lead is electrically connected with the first electrode through a through hole in the piezoelectric induction layer, and an orthographic projection of the driving lead on the touch substrate and an orthographic projection of the read signal line on the touch substrate have an overlapping region; or,
  the driving lead is located on a side of the first electrode away from the second electrode, an insulating layer is arranged between the driving lead and the first electrode, and the driving lead is electrically connected with the first electrode through a through hole in the insulating layer.

In a possible implementation, in the display panel provided in the embodiment of the present invention, the read signal line is located on a side of the second electrode close to the first electrode, and the touch detection device further comprises: driving leads electrically connected with the first electrodes in a one-to-one correspondence manner; the driving lead is located on a side of the read signal line close to the first electrode and electrically connected with the first electrode through a through hole in the piezoelectric induction layer, and an orthographic projection of the driving lead on the touch substrate, an orthographic projection of the read signal line on the touch substrate and an orthographic projection of the second electrode on the touch substrate have an overlapping region.

In a possible implementation, in the display panel provided in some embodiments of the present disclosure, the touch detection device is affixed to a side of the display substrate away from the display surface.

In a second aspect, some embodiments of the present disclosure provide a display device comprising the display panel.

In a third aspect, some embodiments of the present disclosure provide a method for controlling the display panel, comprising:

driving the ultrasonic detection units to emit an ultrasonic wave, and determining a touch position according to a touch detection signal output from the ultrasonic detection units after receiving the ultrasonic wave;

determining a fingerprint recognition area according to the touch position, wherein the touch position is located inside the fingerprint recognition area; and driving at least a part of the ultrasonic detection units located in the fingerprint recognition area to emit an ultrasonic wave, and determining distribution of valleys and ridges in the fingerprint recognition area according to fingerprint recognition signals output from the second electrodes in the at least a part of the ultrasonic detection units after receiving the ultrasonic wave.

In a possible implementation, in the control method provided in some embodiments of the present disclosure, that driving the ultrasonic detection units to emit an ultrasonic wave and determining a touch position according to a touch detection signal output from the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the second electrodes, and receiving the touch detection signal output from the first electrodes in the ultrasonic detection units; and determining the touch position according to the touch detection signal.

In a possible implementation, in the control method provided in some embodiments of the present disclosure, that driving the ultrasonic detection units to emit an ultrasonic wave and determining a touch position according to a touch detection signal output from the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the first electrodes in the ultrasonic detection units, and receiving the touch detection signal output from the second electrodes as a whole; and determining the touch position according to the touch detection signal.

In a possible implementation, in the control method provided in some embodiments of the present disclosure, that driving at least a part of the ultrasonic detection units located in the fingerprint recognition area to emit an ultrasonic wave and determining distribution of valleys and ridges in the fingerprint recognition area according to fingerprint recognition signals output from the second electrodes in the at least a part of the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the first electrodes in the ultrasonic detection units, and receiving the fingerprint recognition signals respectively individually output from the second electrodes; and determining the distribution of valleys and ridges in the fingerprint recognition area according to the fingerprint recognition signals output from the second electrodes in the at least a part of the ultrasonic detection units.

In a possible implementation, in the control method provided in some embodiments of the present disclosure, that determining the fingerprint recognition area according to the touch position comprises:

in the case wherein the display panel is in a standby state, after determining the touch position, determining the fingerprint recognition area according to the touch position; or in the case wherein the display panel is in a touch display stage, after receiving a fingerprint recognition command, determining the fingerprint recognition area according to the touch position.

In a possible implementation, in the control method provided in some embodiments of the present disclosure, the method further comprises: determining a pressing position according to a pressure detection signal output from the ultrasonic detection units after being pressed.

BRIEF DESCRIPTION OF THE DRAWINGS

FIGS. 6a and 6b are structural schematic views of a display panel according to some embodiments of the present disclosure;

FIG. 7 is a flowchart of a method for controlling the display panel according to some embodiments of the disclosure;

DETAILED DESCRIPTION

Figure 1:
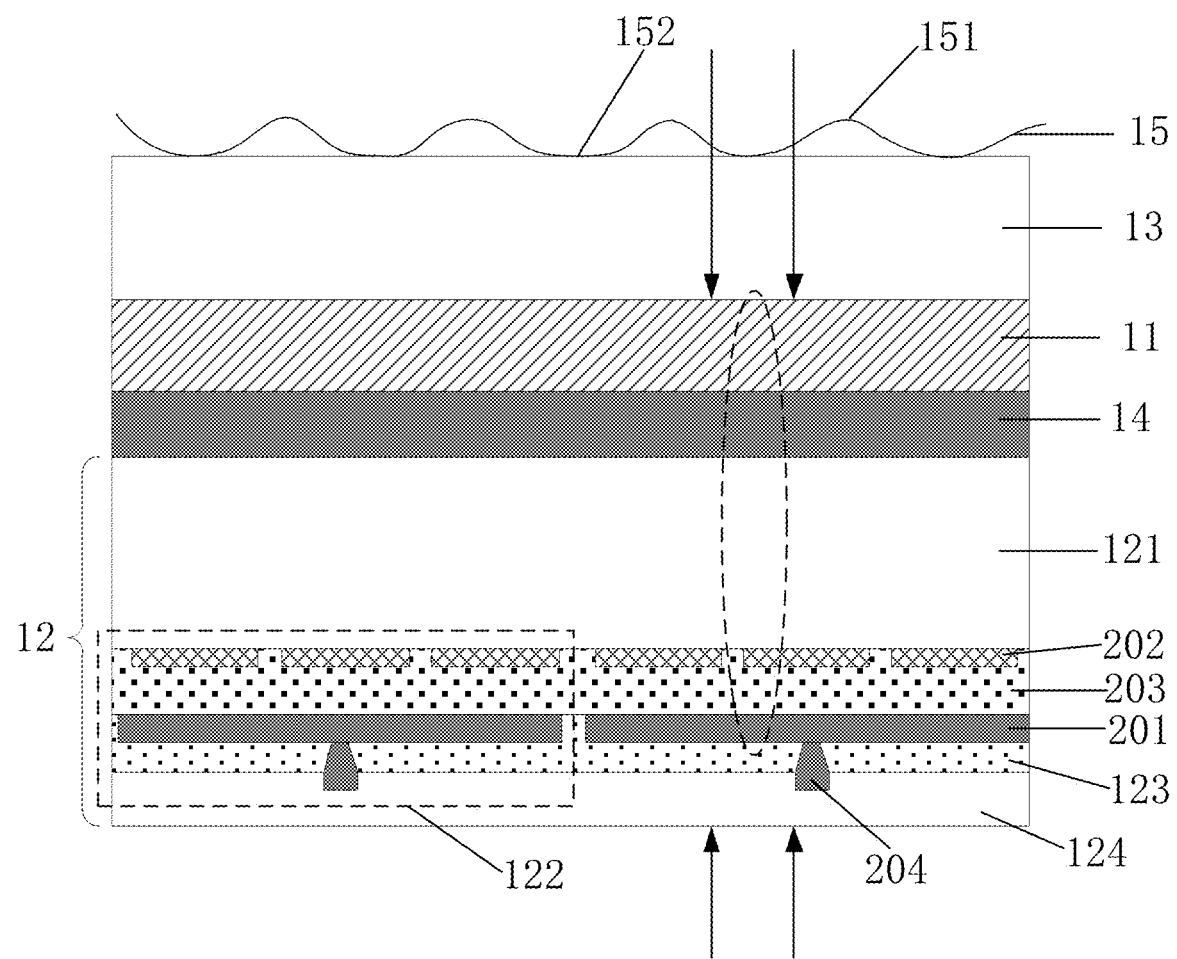
FIG. 1 is a structural schematic diagram of a display panel according to some embodiments of the present disclosure.

In view of a problem in the prior art that, it is difficult for a display device to combine a fingerprint recognition function and a touch detection function, some embodiments of the present disclosure provide a display panel, a control method thereof, and a display device.

Implementations of the display panel, control method thereof, and display device provided according to some embodiments of the present disclosure are described in detail below with reference to the accompanying drawings. The thickness and shape of various film layers in the drawings do not reflect a true scale, but merely illustrate the present disclosure.

In a first aspect, some embodiments of the present disclosure provide a display panel, as shown in FIG. 1, comprising: a display substrate 11 and a touch detection device 12; wherein
- the touch detection device comprises: a touch substrate 121 located on a side of the display substrate 11 away from a display surface, and a plurality of ultrasonic detection units 122 located on a side of the touch substrate 121 away from the display substrate 11;
- the ultrasonic detection unit 122 comprises: a first electrode 201 located on a side of the touch substrate 121 away from the display substrate, a plurality of second electrodes 202 between the touch substrate 121 and the first electrode 201, and a piezoelectric induction layer 203 between the first electrode 201 and the second electrodes 202;
- in a touch detection stage, the ultrasonic detection units 122 is used as an ultrasonic-generating source, and the ultrasonic detection unit 122 outputs a touch detection signal as a whole; and
- in a fingerprint recognition stage, at least a part of the ultrasonic detection units in a fingerprint recognition area are used as an ultrasonic-generating source, and the second electrodes 202 in the at least a part of the ultrasonic detection units 122 in the fingerprint recognition area respectively output fingerprint recognition signals.

In the display panel provided in some embodiments of the present disclosure, one first electrode in each ultrasonic detection unit corresponds to a plurality of second electrodes, and in the touch detection stage, each ultrasonic detection unit performs touch detection as a whole, and in the fingerprint recognition stage, each second electrode respectively outputs a fingerprint recognition signal, so as to combine the touch detection with the fingerprint recognition detection. In addition, in the touch detection stage, each ultrasonic detection unit is used as a whole for detection, so that power consumption in the detection process can be saved.

The piezoelectric induction layer 203 is made of a piezoelectric material, and the piezoelectric induction layer 203 may be made of a material such as polyvinylidene fluoride (PVDF), aluminum nitride (AlN), zinc oxide (ZnO), or lead zirconate titanate (piezoelectric ceramic transducer, PZT).

In the touch detection stage, the ultrasonic detection unit 122 is used as a whole as an ultrasonic-generating source, that is, the second electrodes in the ultrasonic detection unit 122 serve as a whole. In an ultrasonic wave emitting stage, a fixed voltage signal is input to an electrode (for example, the first electrode 201) on one side of the piezoelectric induction layer 203, and a driving signal is input to an electrode (for example, the second electrodes 202 as a whole) on the other side; for example, after an Alternating Current (AC) square wave is input, a piezoelectric material in the piezoelectric induction layer 203 will deform, or the piezoelectric material in the piezoelectric induction layer 203 will drive the upper and lower film layers to vibrate together, so that ultrasonic waves are generated and emitted out; in an ultrasonic wave receiving stage, a fixed voltage signal is input to an electrode (for example, the first electrode 201) on one side of the piezoelectric induction layer 203, and after receiving the ultrasonic wave, the piezoelectric induction layer 203 will convert the ultrasonic wave into an Alternating Current (AC) voltage and output a touch detection signal through an electrode on the other side of the piezoelectric induction layer 203; for example, the second electrodes 202 belonging to the same ultrasonic detection unit 122 may be used as a whole to output the touch detection signal, and the touch position is determined through the touch detection signal.

The ultrasonic wave emitting stage in the fingerprint recognition stage may be the same as that in the touch detection stage, and in the ultrasonic wave receiving stage, a fixed voltage signal needs to be input to the first electrode 201, and after the piezoelectric induction layer 203 receives the ultrasonic wave, the fingerprint recognition signals are output through the second electrodes 202 respectively.

Figure 2:
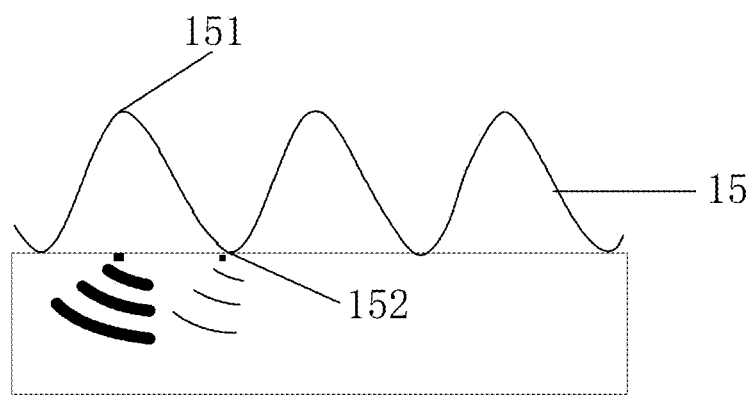
FIG. 2 is a schematic view of ultrasonic waves reflected by valleys and ridges in a fingerprint when the finger touches a display screen, according to some embodiments of the present disclosure.

FIG. 2 is a schematic diagram of ultrasonic waves reflected by valleys 151 and ridges 152 in the fingerprint 15 when a finger touches a display screen. Interface impedances of the valleys 151 and ridges 152 in the fingerprint 15 are different, the position of the valley 151 is equivalent to a cavity inside which air is filled, the interface of the position of the ridge 152 is the skin, and the impedance of air is generally lower than that of other media. Therefore, when the finger touches the display screen, after the ultrasonic waves are emitted to the finger, the energies reflected at the positions of the valley 151 and ridge 152 are different, and the energy reflected at the position of the valley 151 is stronger, thus the positions of the valley 151 and ridge 152 can be determined by the fingerprint recognition signals output from the second electrodes 202.

It should be noted that the concepts of valleys and ridges in the fingerprint in the present disclosure are with respect to the finger, and in FIGS. 1 and 2, the positions of protrusions in the curve represent the positions of the valleys and the positions of depressions in the curve represent the positions of the ridges.

Figure 3A:
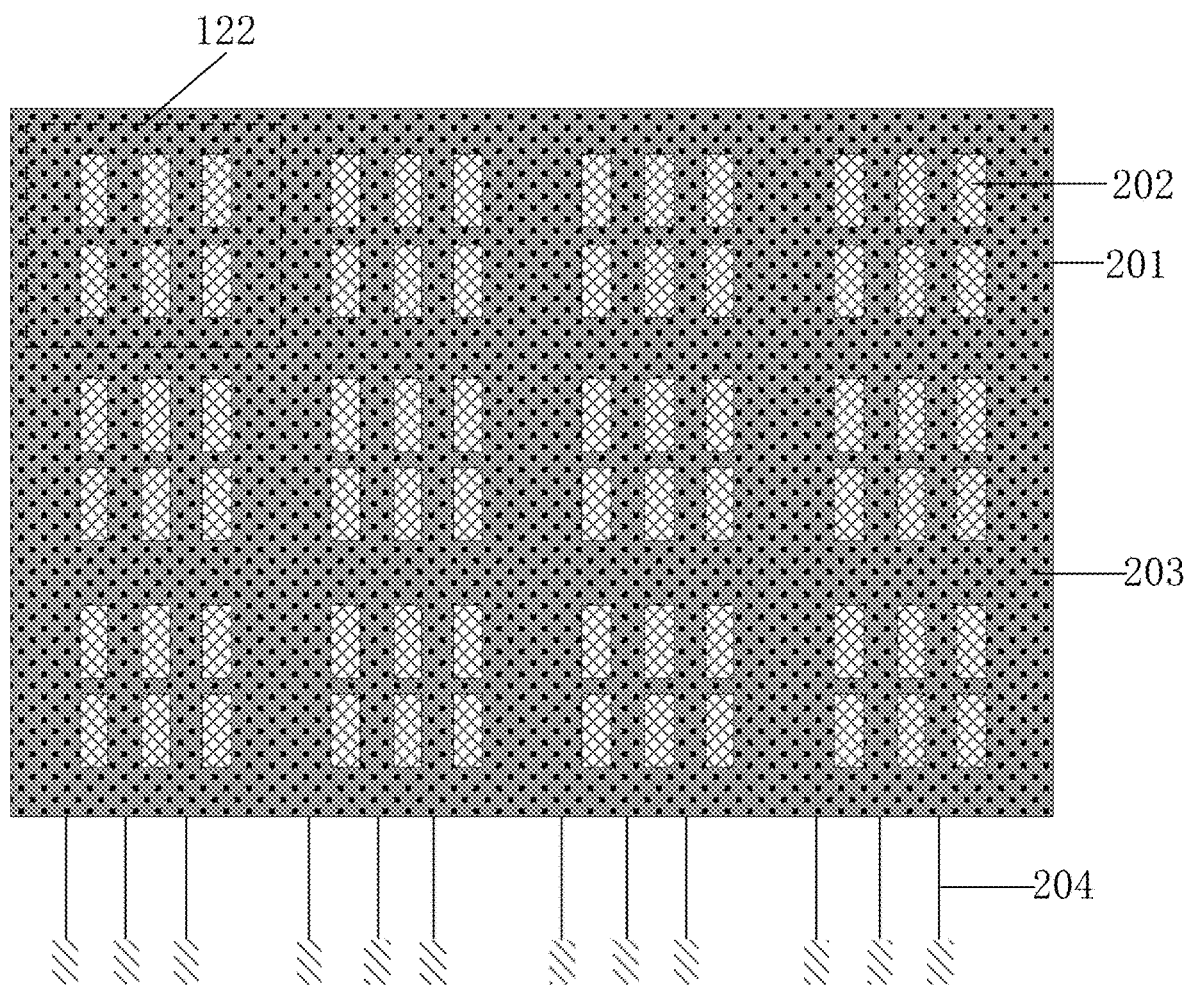
FIG. 3a is a first schematic top view of a touch detection device according to some embodiments of the present disclosure.
Figure 3B:
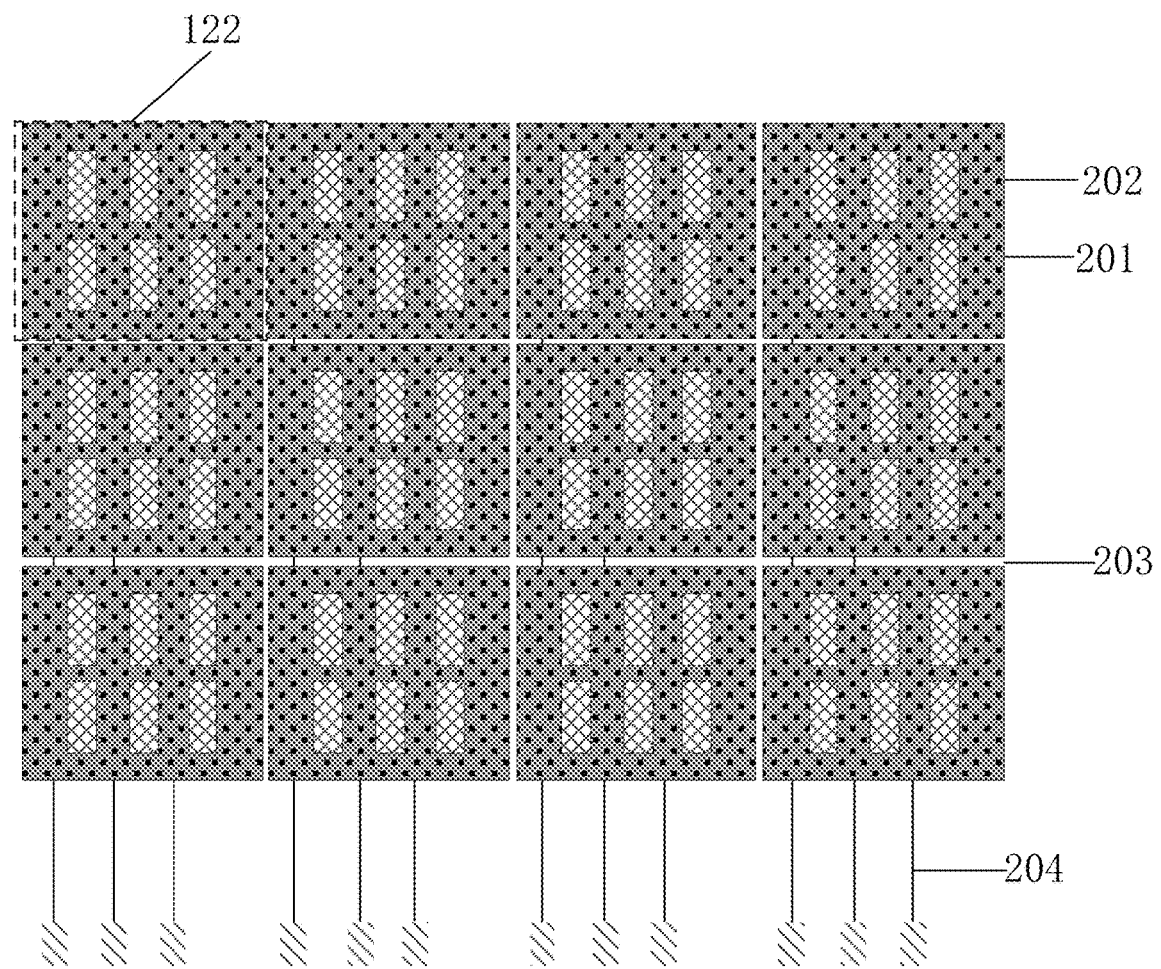
FIG. 3b is a second schematic top view of a touch detection device according to some embodiments of the present disclosure.

FIGS. 3a and 3b are schematic top views of the touch detection device 12, and are taken as an example when viewed from the second electrode 202 toward the first electrode 201. In the figure, three rows and four columns of the ultrasonic detection units 122 are taken as an example for illustration, and in a specific implementation, the number and arrangement of the ultrasonic detection units 122 may be set according to a size of the display panel, which is not limited herein.

Specifically, in the display panel provided in some embodiments of the present disclosure, as shown in FIG. 3a, the first electrode 201 is block-shaped, and the plurality of first electrodes 201 are arranged in an array; and in the ultrasonic detection unit 122, an orthographic projection of the second electrodes 202 on the substrate is located inside an orthographic projection of the first electrode 201 on the substrate.

The plurality of first electrodes 201 are arranged in an array, so that the touch position or the positions of valleys and ridges of the fingerprint can be determined more easily in the detection process, operation steps are saved, and the detection sensitivity is improved. In addition, in the ultrasonic detection unit 122, the second electrodes 202 are disposed within the range of the first electrode 201, so that the signal applied to the piezoelectric induction layer 203 can be stronger, and after the piezoelectric induction layer 203 receives the ultrasonic signal, the detection signal output from the ultrasonic detection units 122 can also be stronger, thereby improving the detection accuracy and sensitivity.

In the figure, each first electrode 201 is illustrated as a square, and each second electrode 202 is illustrated as a rectangle; in a specific implementation, the first electrodes 201 and the second electrodes 202 may also be in other shapes, which is not limited herein; in the figure, the first electrode 201 corresponds to six second electrodes 202, as an example for illustration; in a specific implementation, the number of the second electrodes 202 corresponding to each first electrode 201 may be determined according to actual needs and process accuracy, and the correspondence between the first electrode 201 and the second electrodes 202 is not limited herein.

In a specific implementation, in the display panel provided in some embodiments of the present disclosure, as shown in FIG. 3b, the piezoelectric induction layers 203 in the ultrasonic detection units 122 are independent of each other. That is, in the manufacturing process, the piezoelectric induction layer 203 is patterned, so that the piezoelectric induction layers 203 in the ultrasonic detection units 122 are independent of each other, thereby reducing crosstalk between the ultrasonic detection units 122 and improving the touch or fingerprint detection accuracy. As shown in FIG. 3b, the size of the piezoelectric induction layer 203 may be equivalent to the size of the corresponding first electrode 201, alternatively, the piezoelectric induction layer 203 may be slightly larger than the size of the first electrode 201 in order to ensure sufficient ultrasonic waves are generated.

Figure 4:
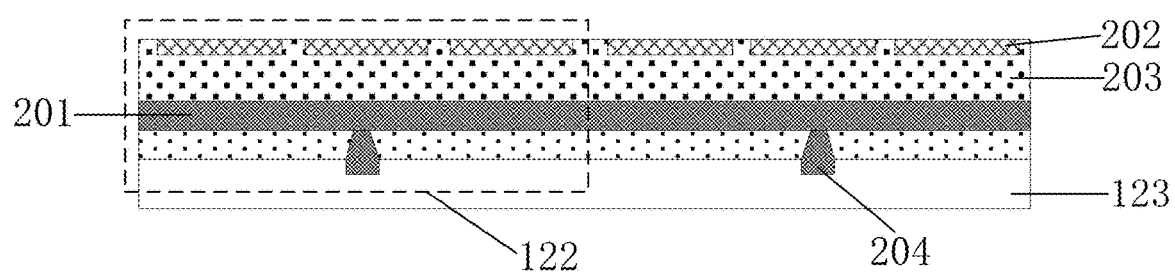
FIG. 4 is a structural schematic diagram of a touch detection device according to some embodiments of the present disclosure.

In addition, in the display panel provided in some embodiments of the present disclosure, as shown in FIG. 4, the first electrodes 201 in the plurality of ultrasonic detection units 122 may also be an integrated structure. That is to say, the film layer where the first electrodes 201 are located may be of a whole-surface structure, so that the structure of the touch detection device may be simpler and has a lower manufacturing cost. Specifically, in the touch detection stage (or the fingerprint recognition stage), in the ultrasonic wave emitting stage, a driving signal may be applied to the first electrode 201, and a fixed voltage signal may be applied to the second electrodes 202; and in the ultrasonic wave receiving stage, a fixed voltage signal may be applied to the first electrode 201, and a touch detection signal (or fingerprint recognition signals) output from the second electrodes 202 may be received, thereby implementing touch detection (or fingerprint recognition detection).

Figure 5:
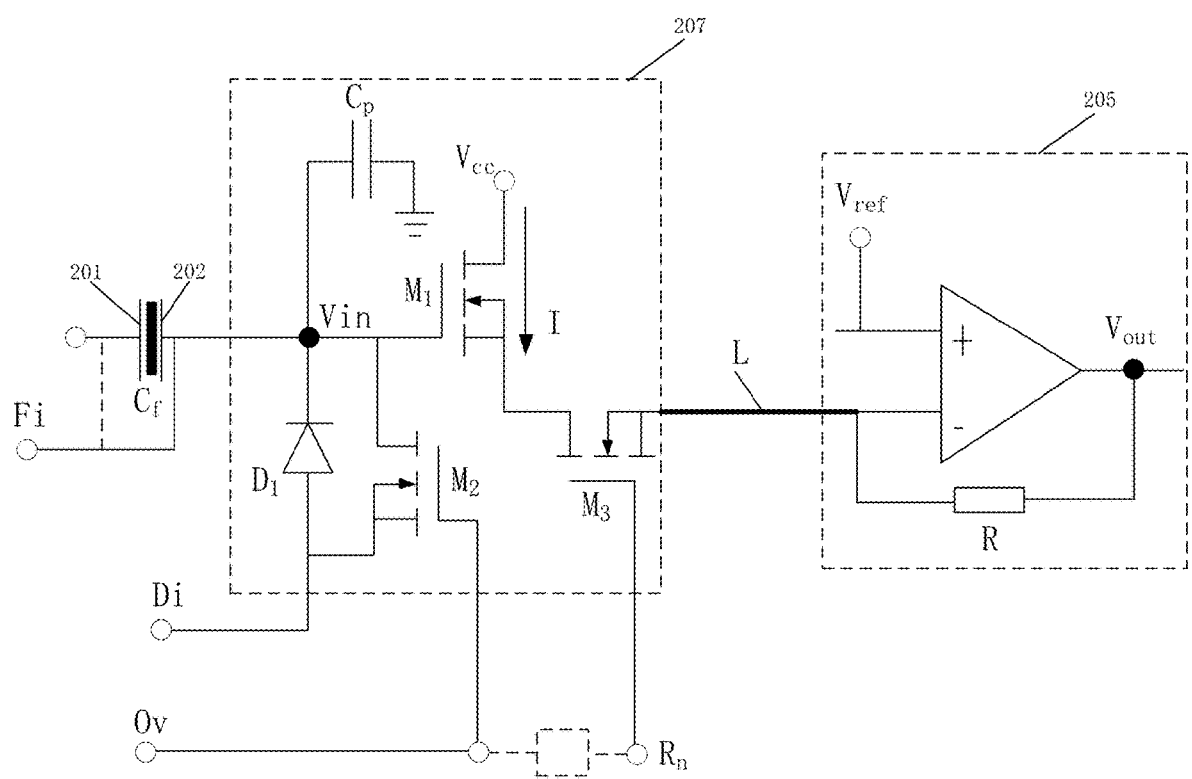
FIG. 5 is a structural schematic diagram of a control circuit and an operational amplifier circuit according to some embodiments of the present disclosure.

Specifically, in the display panel provided in some embodiments of the present disclosure, as shown in FIG. 5, the touch detection device further comprises: a plurality of control circuits 207 one-to-one corresponding to the second electrodes 202, and read signal lines L, wherein the control circuit 207 is configured to control whether to output an signal output from the corresponding second electrode 202; the second electrode 202 is electrically connected to the corresponding control circuit 207, and the read signal lines L are connected to output ends of at least apart of the plurality of control circuits 207.

Specifically, the control circuit 207 may include: a diode $D_1$, a capacitor $C_p$, a switching transistor $M_1$, a switching transistor $M_2$, a switching transistor $M_3$, etc., wherein the second electrode 202, an output end of the diode $D_1$, the capacitor $C_p$, the gate of the switching transistor $M_1$, and the drain of the switching transistor $M_2$ are all connected to a node Vin, an input end of the diode $D_1$ is connected to a signal input end Di, the source of the switching transistor $M_2$ is connected to the signal input end Di, the gate of the switching transistor $M_2$ is connected to a signal input end Ov, the source of the switching transistor $M_1$ is connected to the drain of the switching transistor $M_3$, the source of the switching transistor $M_3$ is connected to an operational amplifier circuit 205, and the gate of the switching transistor $M_3$ is connected to a signal input terminal Rn.

In a specific implementation, the second electrodes in the touch detection device may be arranged in an array, the read signal lines L may be arranged to be connected to a column of the second electrodes 202 through the plurality of control circuits 207, and the control circuits 207 may control whether the ultrasonic detection units at the corresponding positions output signals, so as to read the signal(s) output from one or more ultrasonic detection units at any position(s), and the read signal lines L respectively extend to the non-display area and are electrically connected to the operational amplifier circuits 205 located in the non-display area.

The control circuit 207 can control whether to output the signal output from the corresponding second electrode 202, so that the signal(s) output from any one or more second electrodes 202 can be read. Although not shown in FIG. 1, the control circuit 207 may be located between the second electrode 202 and the touch substrate 121.

Taking the fingerprint recognition stage as an example, the detection principle is as follows:

in the ultrasonic wave emitting stage, the signal Ov is at a high level, the signal Di is at a low level, the signal Rn is at a low level, the switching transistor $M_2$ is turned on, the switching transistor $M_3$ is turned off, the second electrode 202 is pulled low by the signal Di, and a driving signal is applied to the first electrode 201, thereby emitting the ultrasonic waves. On the surface of the display screen, when a finger touches the display screen, since the impedances of the valleys and the ridges of the fingerprint are different, the magnitude of the ultrasonic waves reflected by the valleys and the ridges is also different.

In the ultrasonic wave receiving stage, the signal Di is at a high level, the signal Ov is at a low level, the signal Rn is at a low level, the switching transistor $M_2$ is turned off, and the signal Di charges the capacitor $C_p$ through the diode $D_1$. Thereafter, the signal Di becomes a low level, the signal Ov becomes a low level, the diode $D_1$ is reversely biased, while the switching transistor $M_2$ is kept off, the signal at the node Vin can be kept, the signal Rn is at a high level, the switching transistor $M_3$ is turned on, the node Vin is converted into a current through the switching transistor $M_1$, then the current signal is output to the operational amplifier circuit 205 through the read signal line L, then the operational amplifier circuit 205 converts the current signal into a voltage output, and fingerprint recognition is performed by reading the voltage value as a fingerprint recognition signal.

The detection principle of the touch detection stage is similar to that of the fingerprint recognition stage, and is not repeated here.

In a specific implementation, the diode $D_1$ in the figure may be omitted to simplify the control circuit.

Figure 6A:
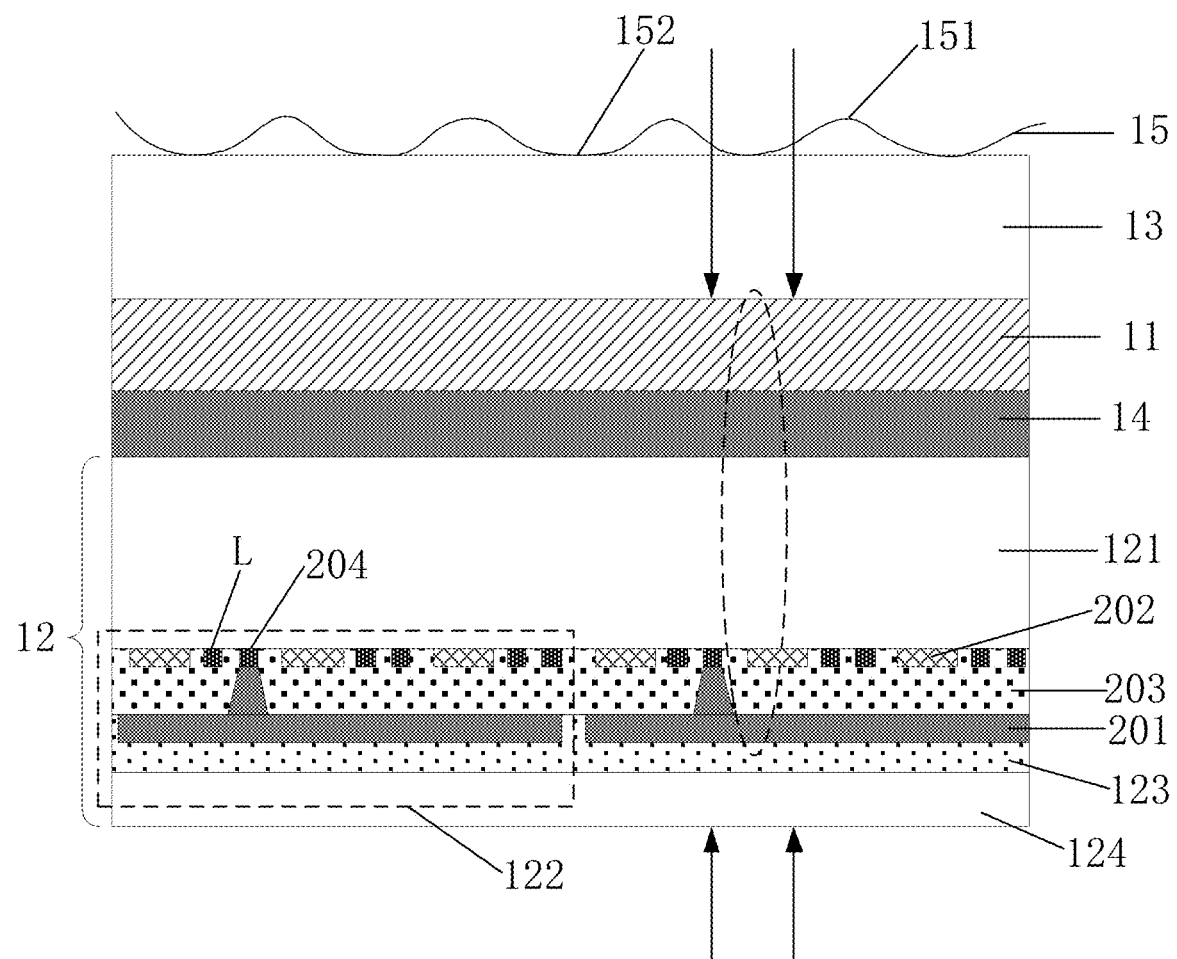

In practical applications, with reference to FIG. 6a, in the display panel provided in some embodiments of the present disclosure, the second electrodes 202 may be disposed in the same layer as the read signal lines L, so that in a manufacturing process, the second electrodes 202 and the read signal lines L may be manufactured by using the same manufacturing process, to save manufacturing cost, and in addition, compared with the case where the two are disposed in different film layers, the thickness of the display panel can also be reduced. In addition, the film layer(s) in the control circuit 207 may be located between the touch substrate 121 and the film layer where the second electrodes 202 are located.

In addition, in a specific implementation, the read signal lines may be disposed in a layer different from the second electrodes, for example, the read signal lines may be disposed in the same film layer as the source-drain metal layer of the switching transistor $M_1$, which also saves the manufacturing cost.

In a specific implementation, in the display panel provided in some embodiments of the present disclosure, the touch detection device may further comprise: driving leads electrically connected with the first electrodes in a one-to-one correspondence manner.

In practical applications, the position of the driving leads can have various implementations as follows.

In some embodiments of the present disclosure, as shown in FIG. 6a, the driving lead 204 is disposed on the same layer as the read signal line L, and the driving lead 204 is electrically connected to the corresponding first electrode 201 through a through hole in the piezoelectric induction layer 203, that is, the second electrode 202, the read signal line L, and the driving lead 204 are disposed on the same layer, and in the manufacturing process, the second electrode 202, the read signal line L, and the driving lead 204 may be formed by the patterning process once, so as to reduce the manufacturing cost.

In some other embodiments of the present disclosure, as shown in FIG. 6b, the driving lead 204 is located on a side of the read signal line L close to the first electrode 201, the driving lead 204 is electrically connected to the first electrode 201 through a through hole in the piezoelectric induction layer 203, and an orthographic projection of the driving lead 204 on the touch substrate 121 has an overlapping region with an orthographic projection of the read signal line L on the touch substrate 121; in the manufacturing process, an insulating medium layer 206 may be formed on a side of the second electrode 202 away from the touch substrate 121, and the driving lead 204 is formed on a side of the insulating medium layer 206 away from the touch substrate 121, so as to ensure that the driving lead 204 is insulated from the read signal line L, so that the orthographic projection of the driving lead 204 on the touch substrate 121 and the orthographic projection of the read signal line L on the touch substrate 121 may have an overlapping region, thereby reducing a spacing area between the second electrodes 202, making the second electrodes 202 tighter, and thus achieving a higher resolution. In addition, in order to further reduce the spacing area between the second electrodes 202, the read signal line L may also be disposed on a side of the second electrode 202 away from the touch substrate 121, so that the read signal line L, the driving lead 204 and the second electrode 202 are respectively located on different film layers, and the orthogonal projection of the read signal line L and the driving lead 204 on the touch substrate 121 and an orthogonal projection of the second electrode 202 on the touch substrate 121 have an overlapping region, so as to achieve an optimal utilization rate of the lateral space.

In still some other embodiments of the present disclosure, as shown in FIG. 1, the driving lead 204 is located on a side of the first electrode 201 away from the second electrode 202, an insulating layer 123 is provided between the driving lead 204 and the first electrode 201, and the driving lead 204 is electrically connected to the first electrode 201 through a through hole in the insulating layer 123. Since there are many signal lines, such as the read signal line L in FIG. 5, on a side of the second electrode 202, the driving lead 204 is disposed on a side of the first electrode 201 away from the second electrode 202, so that short circuit or other signal influence between the driving lead 204 and other signal lines can be avoided, to improve the reliability of the display panel in detecting touch and fingerprint.

In addition, a protection layer 124 is further provided on a side of the driving lead 204 away from the first electrode 201, so as to play a role of protection and planarization, and also weaken aftershock generated by the ultrasonic waves.

In a specific implementation, as shown in FIG. 1, in the display panel provided in some embodiments of the present disclosure, the touch detection device 12 is affixed to a side of the display substrate 11 away from the display surface. In this way, it is possible to prevent the control circuit or the driving lead, etc. in the touch detection device 12 from affecting the normal display of the display substrate 11. Specifically, the size of the touch detection device 12 may be set to be consistent with the size of the display substrate 11, thereby implementing full-screen touch and fingerprint recognition functions.

In addition, the touch detection device 12 is affixed to the side of the display substrate 11 away from the display surface, to also disperse the stress inside the display panel; specifically, for a display panel without the touch detection device, when the finger presses the display panel, the stress will be concentrated on the display substrate 11, and for a display panel with the touch detection device 12, when the finger presses the display panel, the direction of arrows in FIG. 1 is the direction of the stress, the oval in dotted lines represents the position of the stress, and at least a part of the stress will be transferred to the touch detection device 12, so as to reduce the stress in the display substrate 11, and improve the reliability of the display panel.

The touch detection device 12 may be adhered to the display substrate 11 through an adhesive layer 14, may be attached thereto by another means, or may be integrated into the display substrate 11, and the relative positional relationship between the touch detection device and the display substrate 11 is not limited herein.

Specifically, the display substrate 11 may be an Organic Light-Emitting Diode (OLED) display substrate or a Liquid Crystal Display (LCD) substrate, and the display panel may further include a cover plate 13 located on the display surface side of the display substrate 11 in order to protect the display substrate 11.

Further, in the display panel provided in some embodiments of the present disclosure, referring to FIG. 1 as well, the touch substrate 121 in the touch detection device 12 is located between the ultrasonic detection unit 122 and the display substrate 11.

In the manufacturing process of the touch detection device 12, generally, the control circuits electrically connected to the second electrodes 202 are manufactured first, then film layers such as the second electrode 202, the piezoelectric induction layer 203, the first electrode 201, and the like are manufactured, after the touch detection device 12 is manufactured, the touch detection device 12 is affixed to a back surface of the display substrate 11, and the touch detection device 12 is affixed to the display substrate 11 on aside of the touch substrate 121, that is, the touch detection device 12 is in an inverted state in FIG. 1, so that the second electrode 202 can be closer to the display surface of the display panel, and the second electrode 202 is used for outputting a detection signal at least in the fingerprint recognition stage, thereby improving the sensitivity of fingerprint recognition or touch detection.

In a second aspect, based on the same inventive concept, some embodiments of the present disclosure provide a display device comprising the above-mentioned display panel, and the display device may be applied to any product or component with a display function, such as a mobile phone, a tablet computer, a television set, a display, a notebook computer, a digital photo frame, and a navigator. Since the principle of solving the problem of the display device is similar to that of the display panel, the implementations of the display device may refer to the implementations of the display panel, and descriptions thereof are not repeated.

In a third aspect, based on the same inventive concept, some embodiments of the present disclosure provide a method for controlling the display panel. Since the principle of solving the problem of the control method is similar to that of the display panel, the implementations of the control method may refer to the implementations of the display panel, and descriptions thereof are not repeated.

Some embodiments of the present disclosure provide a control method of the display panel, as shown in FIG. 7, comprising:

S301: driving the ultrasonic detection units to emit an ultrasonic wave, and determining a touch position according to a touch detection signal output from the ultrasonic detection units after receiving the ultrasonic wave;

S302: determining a fingerprint recognition area according to the touch position, wherein the touch position is located inside the fingerprint recognition area; and S303: driving at least a part of the ultrasonic detection units located in the fingerprint recognition area to emit an ultrasonic wave, and determining distribution of valleys and ridges in the fingerprint recognition area according to fingerprint recognition signals output from the second electrodes in the at least a part of the ultrasonic detection units after receiving the ultrasonic wave.

In the control method provided in some embodiments of the present disclosure, the ultrasonic detection units are driven to emit an ultrasonic wave, so as to perform touch detection to determine the touch position, and then the fingerprint recognition area is determined according to the touch position, and then the ultrasonic detection units in the fingerprint recognition area is driven to perform fingerprint recognition detection, thereby implementing a fingerprint recognition function at any position of the full screen; moreover, performing fingerprint detection only in the fingerprint recognition area, i.e., performing fingerprint recognition only in a local area, lowers the power consumption in the fingerprint detection process, saves electric energy, and can save fingerprint detection time, to make fingerprint detection more sensitive.

In the step S302, the touch position is located inside the fingerprint recognition area, so as to ensure that when the fingerprint recognition detection is performed in the fingerprint recognition area, the fingerprint of the finger can be detected. In a specific implementation, the touch position generally may be one or more points, and a certain range around the touch position may be determined as the fingerprint recognition area according to actual situations, for example, a square with aside length of 1cm and taking the touch position as a center may be used as the fingerprint recognition area. It is merely an example here, and the shape, size and other parameters of the fingerprint recognition area may be set according to actual needs in specific implementations; for example, the fingerprint recognition area may be square, circular or oval, or the touch position may also be deviated from a geometric center of the fingerprint recognition area, which is not limited herein.

In order to obtain more fingerprint information, the fingerprint recognition area may be set to be slightly larger than an contact area between the finger and the display screen, or the fingerprint recognition area may also be set to be slightly smaller than the contact area between the finger and the display screen, which is not limited herein.

Figure 8:
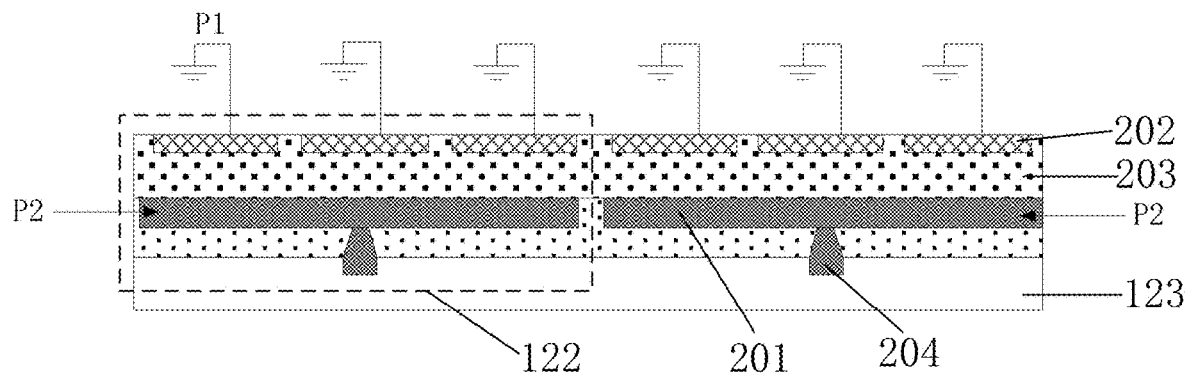
FIG. 8 is a schematic diagram of applying a signal to the ultrasonic detection unit in an ultrasonic wave emitting stage, according to some embodiments of the present disclosure.
Figure 9:
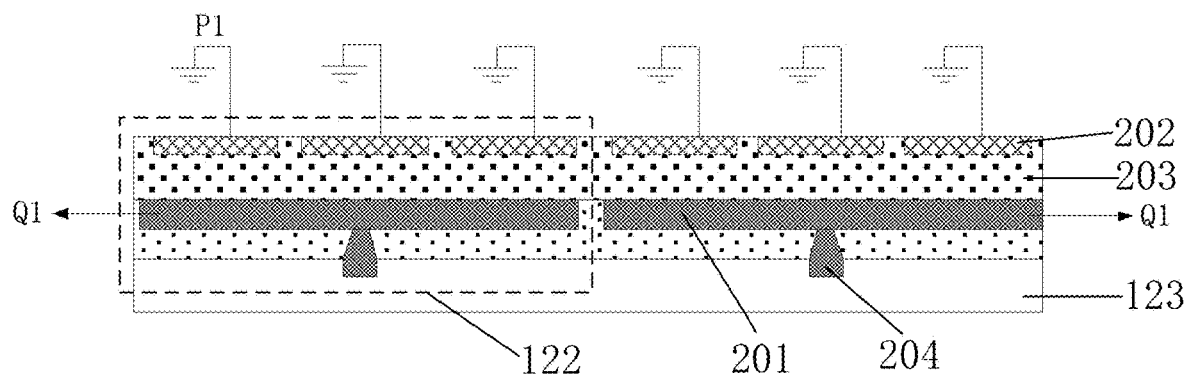
FIG. 9 is a first schematic diagram of an ultrasonic detection unit outputting a touch detection signal in a touch detection stage according to some embodiments of the present disclosure.

Specifically, the step S301 may be implemented in the following manners:

Manner 1:

In the ultrasonic wave emitting stage, as shown in FIG. 8, a driving signal P2 is applied to the first electrode 201 in the ultrasonic detection unit 122, and a fixed voltage signal P1 is applied to the second electrode 202, for example, the second electrode 202 may be a ground (GND) setting;

in the ultrasonic wave receiving stage, as shown in FIG. 9, the fixed voltage signal P1 is applied to each second electrode 202, and a touch detection signal Q1 output from the first electrode 201 in the ultrasonic detection unit 122 is received; and the touch position is determined according to the touch detection signal Q1.

That is, in both the ultrasonic wave emitting stage and the ultrasonic wave receiving stage, the fixed voltage signal P1 is applied to each second electrode 202; the driving signal P2 is input to the first electrode 201 in the ultrasonic wave emitting stage, and the touch detection signal Q1 output from the first electrode 201 is read in the ultrasonic wave receiving stage, so that the ultrasonic detection unit 122 emits ultrasonic waves as an ultrasonic-generating source, and outputs the touch detection signal Q1 as a whole after receiving the ultrasonic waves.

Figure 10:
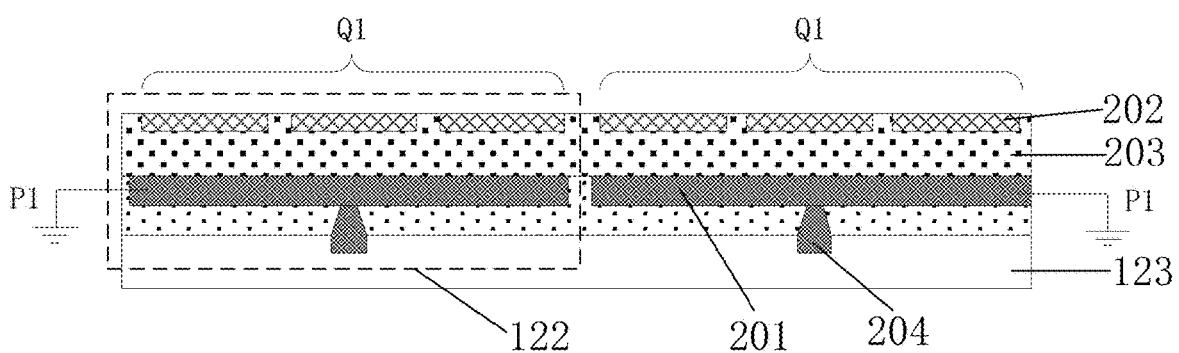
FIG. 10 is a second schematic diagram of an ultrasonic detection unit outputting a touch detection signal in a touch detection stage according to some embodiments of the present disclosure.

Manner 2:

In the ultrasonic wave emitting stage, as shown in FIG. 8, a driving signal P2 is applied to the first electrode 201 in the ultrasonic detection unit 122, and a fixed voltage signal P1 is applied to the second electrode 202;

in the ultrasonic wave receiving stage, as shown in FIG. 10, the fixed voltage signal P1 is applied to the first electrodes 201 in the ultrasonic detection unit 122, and the touch detection signal Q1 output from the second electrodes 202 as a whole is received; and the touch position is determined according to the touch detection signal Q1.

The ultrasonic wave emitting stage in Manner 2 is the same as that in Manner 1, and the two differ from each other only in that: in the ultrasonic wave receiving stage in Manner 2, the fixed voltage signal P1 is applied to the first electrode 201, and the touch detection signal Q1 output from the second electrodes 202 as a whole is received, so that the ultrasonic detection unit 122 can also emit ultrasonic waves as an ultrasonic-generating source, and the touch detection signal Q1 can be output as a whole after receiving the ultrasonic waves.

Figure 11:
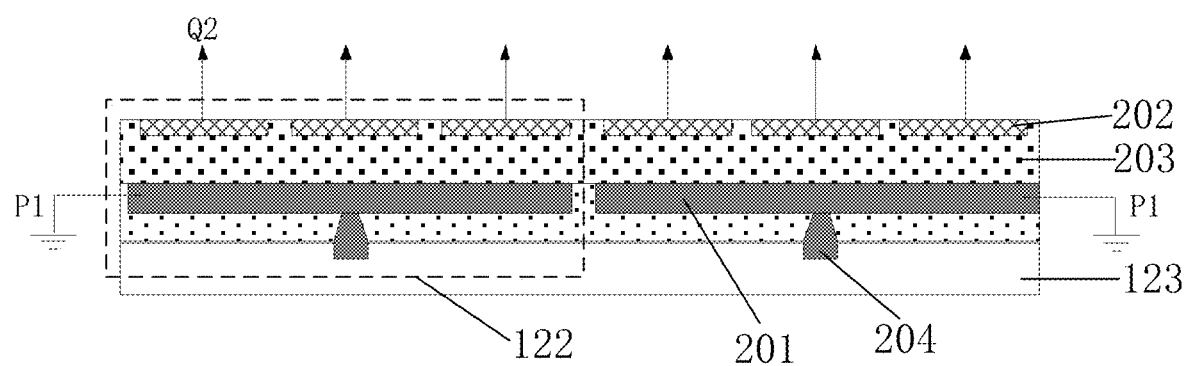
FIG. 11 is a schematic diagram of an ultrasonic detection unit outputting a fingerprint recognition signal in a fingerprint recognition stage according to some embodiments of the present disclosure.

In a specific implementation, in the control method provided in some embodiments of the present disclosure, the step S303 may comprise:

in the ultrasonic wave emitting stage, as shown in FIG. 8, a driving signal P2 is applied to the first electrode 201 in the ultrasonic detection unit 122, and a fixed voltage signal P1 is applied to the second electrode 202;

in the ultrasonic wave receiving stage, as shown in FIG. 11, the fixed voltage signal P1 is applied to the first electrode 201 in the ultrasonic detection unit 122, and fingerprint recognition signals Q2 which is individually output from the second electrodes 202 are received;

the distribution of the valleys and ridges in the fingerprint recognition area is determined according to the fingerprint recognition signals Q2 output from the second electrodes 202 in at least a part of the ultrasonic detection unit 122.

Since the sizes of the valleys and the ridges in the fingerprint are generally small, in order to obtain a clear fingerprint pattern, in the ultrasonic receiving stage, the fingerprint recognition signals respectively individually output from the second electrodes 202 are received, and the second electrode 202 is closer to the display surface of the display panel after the touch detection device is inversely affixed to the back surface of the display substrate, so that the received fingerprint recognition signal is higher in sensitivity.

In a specific implementation, in the control method provided in some embodiments of the present disclosure, the step S302 may comprise:

in the case wherein the display panel is in a standby state, after the touch position is determined, determining the fingerprint recognition area according to the touch position; specifically, in the case wherein the display panel is in a standby state, ultrasonic touch scanning is performed at a low frequency, that is, the step S301 is continuously performed at a low frequency; since low-frequency scanning is adopted, a relatively low power consumption is required, and finger touch can be detected; when the display panel is detected to be touched and after the touch position is determined, fingerprint recognition detection is triggered, the fingerprint recognition detection is performed only in the fingerprint recognition area, so that the power consumed in the fingerprint detection process is relatively low, and after the detected fingerprint pattern matches finger information, the process enters a normal display and touch stage, i.e., successful unlocking.

Or, in the case wherein the display panel is in the touch display stage, after a fingerprint recognition command is received, a fingerprint recognition area is determined according to the touch position; after the display panel is unlocked, it enters the normal display and touch stage in which not all touches need fingerprint recognition; in order to avoid misoperation, fingerprint recognition is performed only after the fingerprint recognition command is received; for example, operations such as payment or unlocking need to be performed by fingerprint authentication in a certain application, and when the application enters the payment or unlocking interface, the fingerprint recognition command is simultaneously sent out, so that when the finger touches the display panel again, the fingerprint recognition operation is performed; it is merely an example here, and in specific implementations, the triggering condition for fingerprint recognition can be set according to actual needs, and no limitation is made here.

In addition, the control method provided in some embodiments of the present disclosure may further comprise a function of detecting a pressing position, and specifically, the control method may further comprise:

determining the pressing position according to a pressure detection signal output from the ultrasonic detection units after being pressed.

After the piezoelectric induction layer in the ultrasonic detection unit senses the pressure, the pressure can be converted into an electric signal to output a pressure detection signal, for example, a fixed voltage signal can be input to each second electrode, thus the pressing position can be determined by reading the pressure detection signal output from the first electrode. Since the waveform and the signal output from the ultrasonic detection unit are different when the touch position is detected and the pressing position is detected, the touch operation and the pressing operation of the finger can be obviously distinguished, and a magnitude of the force pressed on the display panel can be roughly judged according to a magnitude of the pressure detection signal. Some embodiments of the present disclosure provide a display panel, which can realize integration of three functions, namely, touch detection, fingerprint detection and pressure detection.

According to the display panel, control method thereof and display device provided in some embodiments of the present disclosure, in the display panel, one first electrode in each ultrasonic detection unit corresponds to a plurality of second electrodes; in the touch detection stage, the ultrasonic detection unit performs touch detection as a whole, and in the fingerprint recognition stage, the second electrodes output fingerprint recognition signals respectively, so that the touch detection and the fingerprint recognition detection are combined. In the control method of the display panel, the ultrasonic detection unit is driven to emit ultrasonic waves, so that touch detection is performed to determine a touch position, then a fingerprint recognition area is determined according to the touch position, then the ultrasonic detection units in the fingerprint recognition area is driven to perform fingerprint recognition detection, so that the fingerprint recognition function is realized at any position of the full screen, and fingerprint detection is performed only in the fingerprint recognition area, namely, fingerprint recognition is performed only in a local area, which lowers the power consumption in the fingerprint detection process, saves electric energy, and can save fingerprint detection time, to make fingerprint detection more sensitive. In addition, the ultrasonic detection unit can also output a pressure detection signal after being pressed, the pressing position can be judged through the pressure detection signal, and the magnitude of the pressure can be roughly judged, so that integration of three functions of touch detection, fingerprint detection and pressure detection can be realized.

It will be apparent to those skilled in the art that various changes and modifications may be made to the present disclosure without departing from the spirit and scope of the disclosure. Thus, it is intended that the present disclosure also encompass such changes and modifications as fall within the scope of the claims and their equivalents.

What is claimed is:

1. A display panel, comprising: a display substrate and a touch detection device; wherein the touch detection device comprises: a touch substrate located on a side of the display substrate away from a display surface, and a plurality of ultrasonic detection units located on a side of the touch substrate away from the display substrate;

the ultrasonic detection unit comprises: a first electrode located on a side of the touch substrate away from the display substrate, a plurality of second electrodes between the touch substrate and the first electrode, and a piezoelectric induction layer between the first electrode and the second electrodes;

in a touch detection stage, the ultrasonic detection unit is used as an ultrasonic-generating source, and the ultrasonic detection unit outputs a touch detection signal as a whole; and in a fingerprint recognition stage, at least a part of the ultrasonic detection units in a fingerprint recognition area are used as an ultrasonic-generating source, and the second electrodes in the at least a part of the ultrasonic detection units in the fingerprint recognition area respectively output fingerprint recognition signals, wherein:

the touch detection device further comprises: a plurality of control circuits in one-to-one correspondence with the second electrodes, and read signal lines, wherein the control circuit is located between the second electrode and the touch substrate and configured to control whether to output an signal output from the corresponding second electrode;

the second electrode is electrically connected with the corresponding control circuit, and the read signal lines are connected with output ends of at least a part of the control circuits; and the read signal line is located on a side of the second electrode close to the first electrode, and the touch detection device further comprises: driving leads electrically connected with the first electrodes in a one-to-one correspondence manner; the driving lead is located on a side of the read signal line close to the first electrode and electrically connected with the first electrode through a through hole in the piezoelectric induction layer, and an orthographic projection of the driving lead on the touch substrate, an orthographic projection of the read signal line on the touch substrate and an orthographic projection of the second electrode on the touch substrate have an overlapping region.

2. The display panel according to claim 1, wherein the first electrode is block-shaped, and the plurality of first electrodes are arranged in an array; and in the ultrasonic detection unit, an orthographic projection of the second electrodes on the touch substrate is located inside an orthographic projection of the first electrode on the touch substrate.

3. The display panel according to claim 1, wherein the piezoelectric induction layers in the ultrasonic detection units are independent of each other.

4. The display panel according to claim 1, wherein the first electrodes of the plurality of ultrasonic detection units are of an integrated structure.

5. The display panel according to claim 1, wherein the touch detection device is affixed to a side of the display substrate away from the display surface.

6. A display device comprising the display panel according to claim 1.

7. A method for controlling the display panel according to claim 1, comprising:

driving the ultrasonic detection units to emit an ultrasonic wave, and determining a touch position according to a touch detection signal output from the ultrasonic detection units after receiving the ultrasonic wave;

determining a fingerprint recognition area according to the touch position, wherein the touch position is located inside the fingerprint recognition area; and driving at least a part of the ultrasonic detection units located in the fingerprint recognition area to emit an ultrasonic wave, and determining distribution of valleys and ridges in the fingerprint recognition area according to fingerprint recognition signals output from the second electrodes in the at least a part of the ultrasonic detection units after receiving the ultrasonic wave.

8. The control method according to claim 7, wherein that driving the ultrasonic detection units to emit an ultrasonic wave and determining a touch position according to a touch detection signal output from the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the second electrodes, and receiving the touch detection signal output from the first electrodes in the ultrasonic detection units; and determining the touch position according to the touch detection signal.

9. The control method according to claim 7, wherein that driving the ultrasonic detection units to emit an ultrasonic wave and determining a touch position according to a touch detection signal output from the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the first electrodes in the ultrasonic detection units, and receiving the touch detection signal output from the second electrodes as a whole; and determining the touch position according to the touch detection signal.

10. The control method according to claim 7, wherein that driving at least a part of the ultrasonic detection units located in the fingerprint recognition area to emit an ultrasonic wave and determining distribution of valleys and ridges in the fingerprint recognition area according to fingerprint recognition signals output from the second electrodes in the at least a part of the ultrasonic detection units after receiving the ultrasonic wave comprises:

in an ultrasonic wave emitting stage, applying a driving signal to the first electrodes in the ultrasonic detection units, and applying a fixed voltage signal to the second electrodes;

in an ultrasonic wave receiving stage, applying the fixed voltage signal to the first electrodes in the ultrasonic detection units, and receiving the fingerprint recognition signals respectively individually output from the second electrodes; and determining the distribution of valleys and ridges in the fingerprint recognition area according to the fingerprint recognition signals output from the second electrodes in the at least a part of the ultrasonic detection units.

11. The control method according to claim 7, wherein that determining the fingerprint recognition area according to the touch position comprises:

in the case wherein the display panel is in a standby state, after determining the touch position, determining the fingerprint recognition area according to the touch position; or in the case wherein the display panel is in a touch display stage, after receiving a fingerprint recognition command, determining the fingerprint recognition area according to the touch position.

12. The control method according to claim 7, further comprising: determining a pressing position according to a pressure detection signal output from the ultrasonic detection units after being pressed.

* * * * *